United States Patent [19]

Kane

[11] Patent Number: 4,723,563
[45] Date of Patent: Feb. 9, 1988

[54] WHEEL SOAPER

[75] Inventor: John P. Kane, Sterling Heights, Mich.

[73] Assignee: Allied Automation Systems, Inc., Detroit, Mich.

[21] Appl. No.: 890,379

[22] Filed: Jul. 29, 1986

[51] Int. Cl.⁴ .......................... B08B 3/00; B05B 13/02
[52] U.S. Cl. ...................................... 134/144; 118/320
[58] Field of Search ............... 134/144, 123, 153, 131, 134/129, 128, 86, 66; 118/318, 320, 321, 322

[56] References Cited

U.S. PATENT DOCUMENTS

| | | | |
|---|---|---|---|
| 3,906,894 | 9/1975 | Pesapane | 118/321 X |
| 4,314,524 | 2/1982 | Deguchi | 134/134 X |
| 4,430,958 | 2/1984 | Boggs | 118/318 X |
| 4,457,419 | 7/1984 | Ogami et al. | 198/345 |
| 4,563,975 | 1/1986 | Kozlowski et al. | 118/320 |
| 4,669,417 | 6/1987 | Pederson et al. | 118/320 X |

FOREIGN PATENT DOCUMENTS 2059812  4/1981  United Kingdom .

Primary Examiner—Stuart S. Levy
Assistant Examiner—Steven M. duBois
Attorney, Agent, or Firm—Basile and Hanlon

[57] ABSTRACT

A wheel soaper for spraying soap on a wheel rim includes a conveyor for conveying wheels in a horizontal position in succession to a soaping station. A downwardly facing frictional drive disc is located above the conveyor at the soaping station clear of the path of movement of wheels and is mounted for rotation about a fixed vertical axis. A cone member is mounted beneath the disc in coaxial relationship with the disc for free rotation and is driven in vertical movement by a reciprocating air motor upwardly from and downwardly to a normally maintained rest position below the path of wheels on the conveyor. When a wheel is stopped on the conveyor at the soaping station, the cone is driven upwardly into the central opening of the wheel to lift the wheel from the conveyor until the upper rim of the wheel is firmly pressed against the drive disc which is then driven in rotation as soap is sprayed from a stationary nozzle onto the rotating wheel rim.

The cone provides a self centering action and a pressure regulator connected to the air motor stops further elevating movement when the wheel is clamped against the disc to enable the apparatus to soap wheels of various diameters and axial widths.

6 Claims, 4 Drawing Figures

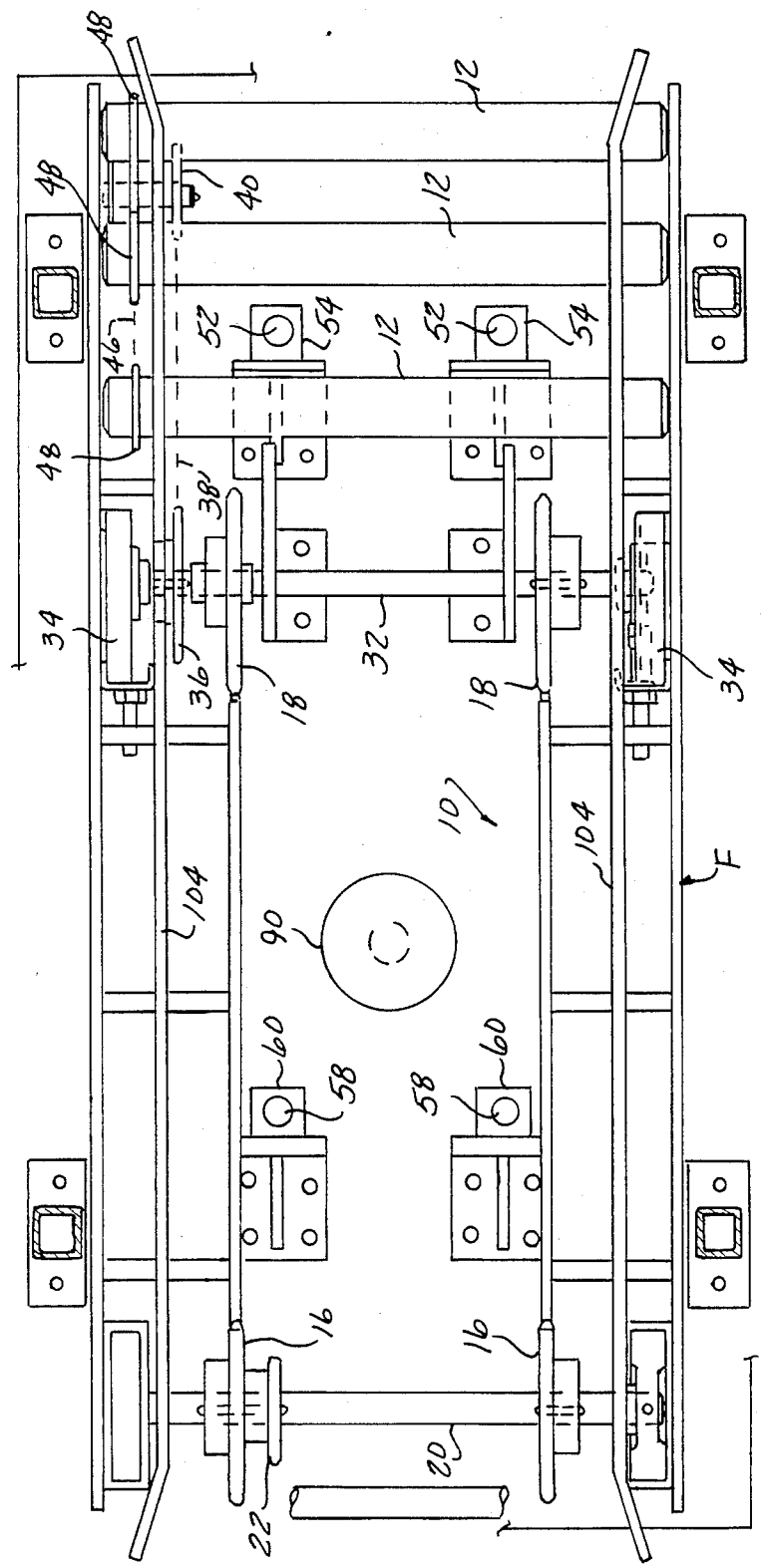
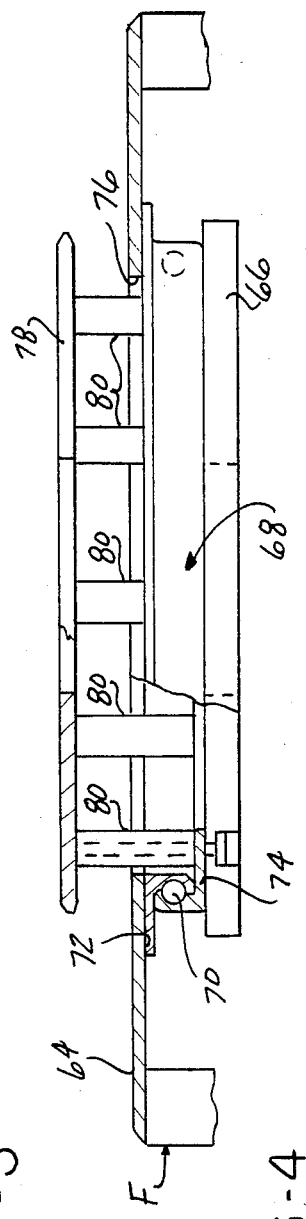
FIG-3
FIG-4

WHEEL SOAPER

BACKGROUND OF THE INVENTION

The present invention is directed to an apparatus for spraying a liquid soap or lubricant composition upon the rim of a vehicle wheel on a mass production basis.

It is quite conventional in the automotive industry to apply a soap or lubricant composition to the rim of a wheel to facilitate the mounting of a tire upon the wheel. Various machines have been developed for soaping wheel rims on a mass production basis, however, for true mass production line use, the soaper must be able to handle several different models or sizes of wheels whose outside diameter, axial width, and center hole diameter will differ from each other over ranges as large as 4 or 5 inches. A set of standard steel wheels for an economy car may be followed through the soaper by a set of optional solid aluminum wheels of substantially greater axial width. This procedure does not allow for any adjustment or resetting of the wheel engaging parts of the soaper to accommodate for dimensional differences and the soaper must thus be capable of accepting and handling wheels having outside diameters, axial widths and center hole openings falling anywhere within pre-selected dimensional ranges.

While this problem has been considered in the prior art, see for example U.S. Pat. No. 4,563,975, the solutions proposed in general leave something to be desired.

The present invention is directed to a wheel soaping apparatus in which wheels of different diameters, falling within a relatively large size range, are automatically self-centered relative to a fixed axis of rotation and in which wheels of axial widths falling within a relatively large size range have the rim which is to be sprayed always located in the same vertical relationship to the soap spray nozzle.

SUMMARY OF THE INVENTION

In accordance with the present invention, wheels to be soaped are fed horizontally along a roller chain conveyor into underlying relationship with a rotating drive disc mounted for rotation about a fixed vertical axis. The lower surface of the drive disc is covered with a resilient pad and is spaced above the conveyor chains by a distance exceeding the maximum axial width of wheel to be handled by the apparatus. Retractable stop pins positioned between the chains may be extended to project upwardly into the path of a wheel being conveyed along the horizontal upper runs of the chains to stop the wheel at a location generally beneath the rotating disc, but not necessarily with the wheel axis, depending upon the wheel diameter, in alignment with the axis of rotation of the disc.

A downwardly divergent conical member is mounted for free rotation about its axis in coaxial relationship to the disc and for vertical movement along that vertical axis between a retracted position in which the tip of the conical member is below the path of movement of wheels on the conveyor and an upwardly projecting position. When a wheel is engaged by the stop, the conical member is elevated from its retracted position and its tip projects upwardly into the central opening of the wheel engaged by the stop. It is not necessary that the central wheel opening and the conical member be in coaxial relationship initially. Continued upward movement of the conical member, whose base is of a diameter larger than the maximum wheel opening diameter, will eventually lift the wheel upwardly from the conveyor and as this action takes place, the wheel will slide downwardly on the conical surface until it centers itself upon the conical member. Further upward movement of the conical member with the wheel supported upon it, will move the upper rim of the wheel into frictional engagement with the rotating drive disc, and as the wheel and cone are driven in rotation, soap is sprayed onto the upper rim of the wheel. The cone is elevated by the piston rod of a relatively long stroke pneumatic cylinder which is provided with a pressure regulator establishing a maximum lifting pressure at which a wheel may be pressed against the rotating disc to assure frictional coupling between the disc and wheel. Thus, the vertical stroke of the lifting motor accommodates itself to the width of the wheel being handled. The control system of the lift motor is such that the motor automatically lowers the cone and wheel a predetermined time interval.

Other objects and features will become apparent by reference to the following specification and to the drawings.

IN THE DRAWINGS

FIG. 3 is a cross-sectional view taken on line 3—3 of FIG. 1; and

FIG. 4 is a side elevational view, partially in section, with certain parts broken away, showing details of the rotary drive disc of the soaper of FIG. 1.

Figure 1:
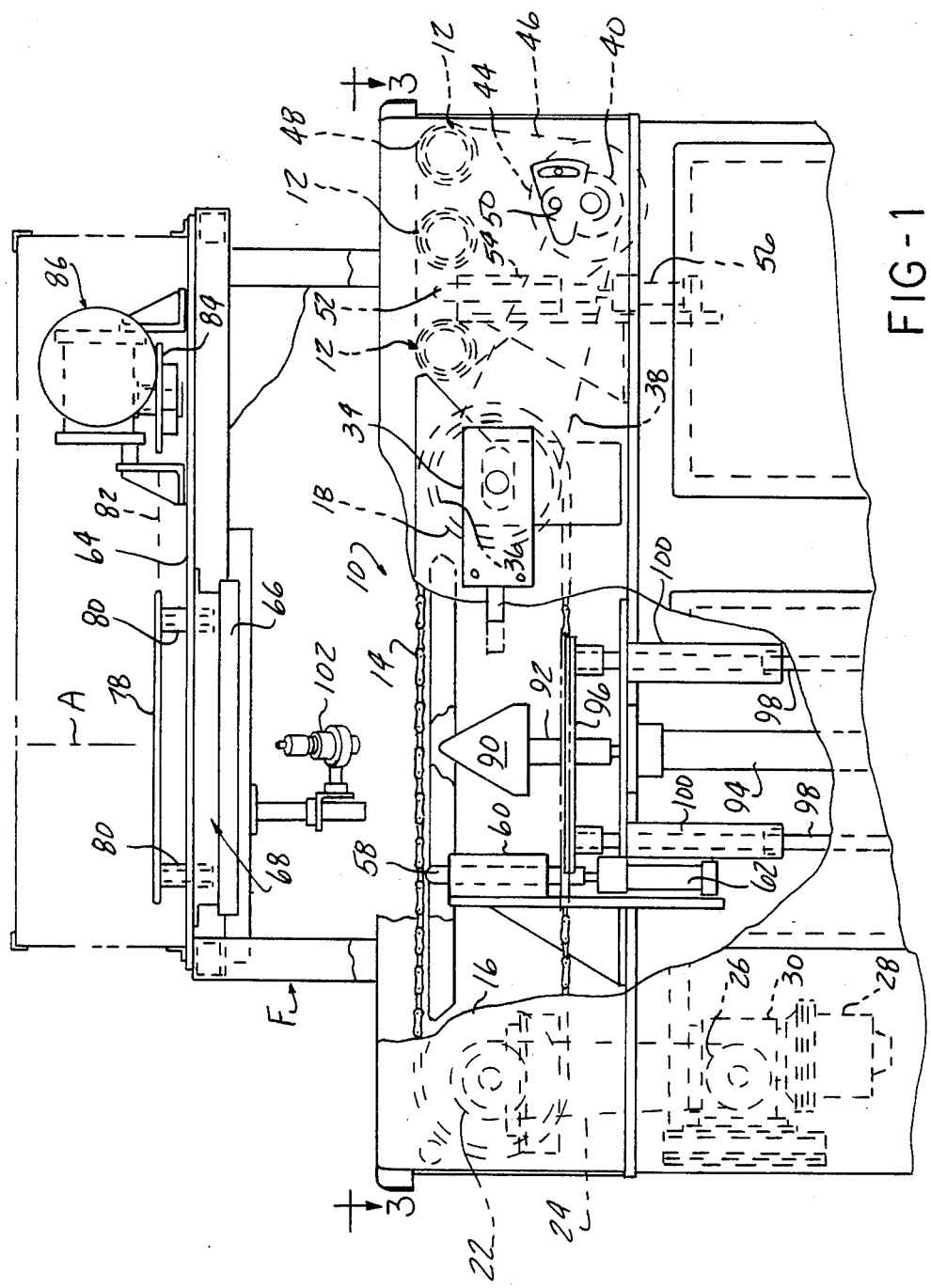
FIG. 1 is a side elevational view, with certain parts broken away or omitted, of a wheel soaper embodying the present invention.
Figure 2:
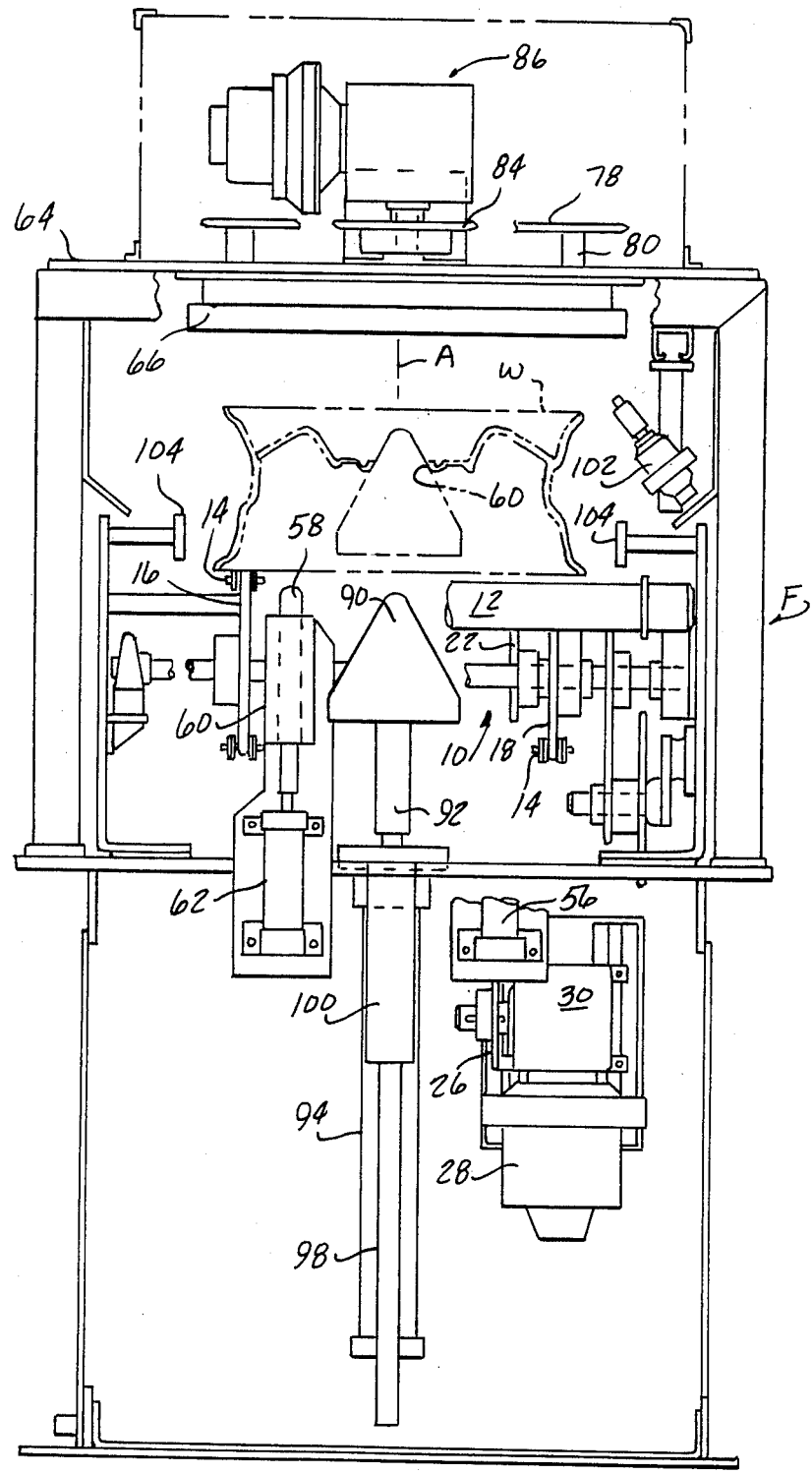
FIG. 2 is an end view, again with certain parts broken away or omitted, of the wheel soaper of FIG. 1.

A wheel soaper embodying the present invention includes a conveyor designated generally 10 mounted upon a fixed frame designated generally F. Referring particularly to FIGS. 1 and 3, the conveyor 10 includes an inlet section, constituted by three power driven conveyor rollers 12, and a main conveying section, constituted by a pair of roller chains 14 operatively trained about first and second end sprocket pairs 16 and 18 respectively. End sprockets 16 are commonly mounted upon a shaft 20 for rotation about a fixed horizontal axis within frame F. A drive sprocket 22 is fixedly mounted upon shaft 20 and coupled by an endless chain 24 to a sprocket 26 (FIGS. 1 and 2) which is driven in rotation by an air motor 28 acting through a suitable gear reduction box 30 (FIG. 2).

The other pair of end sprockets 18 are commonly mounted upon a second shaft 32 whose opposite ends (FIG. 3) are carried by a pair of chain tensioning devices 34 of conventional construction which are in turn mounted on the fixed frame F.

Conveyor rollers 12 are in turn driven from shaft 32 by means of a sprocket 36 fixedly mounted on the shaft which is coupled via an endless chain 38 to a sprocket 40 mounted on a shaft 42 which carries a second sprocket 44 coupled by means of an endless chain 46 to sprockets 48 mounted on the respective rollers 12. The shaft 42 is carried by a suitable chain tensioning device 50 (FIG. 1) for adjustment relative to frame F.

Thus, chains 14 and rollers 12 are driven by air motor 28 simultaneously. The various sprocket diameters are chosen to be such that the conveying speed of roller chains 14 exceeds the conveying speed of rollers 12 by approximately 15 to 20 percent for reasons which will become apparent below. The direction of movement of the rollers 12 and chains 14 is such as to move articles supported upon the rollers and chains from right to left as viewed in FIGS. 1 and 3.

A first pair of retractable stop pins 52 are mounted within fixed sleeves 54 for guided vertical movement between two of conveyor rollers 12 as best seen in FIGS. 1 and 3. Reciprocating air cylinders 56 are employed to selectively position stop pins 52 vertically either in a retracted position below the path of articles moving across rollers 12 or an extended position in which the pin 52 projects upwardly into the path of movement of articles along the rollers 12.

A second pair of stop pins 58 are mounted upon the frame F at a location slightly upstream from sprocket 16 of the roller chain conveyor. Like pins 52, pins 58 are slidably guided in vertical movement by means of sleeves 60 and reciprocating air cylinders 62 which are employed to position the pins 58 alternatively in the retracted position, shown in full line in FIG. 1, below the upper run of chain 14 and an extended position in which the pin 58 projects upwardly above chain 14 to stop movement of articles along the upper run of chain 14.

Referring now particularly to FIGS. 1 and 2, it is seen that the frame F includes a horizontal support platform 64 which is fixedly supported in an elevated position above an overlying portions of the infeed conveyor section defined by rollers 12, and the major portion of the main conveyor defined by the roller chains 14. A circular drive disc 66 is mounted in underlying relationship to platform 64 for rotation about a vertical axis A which intersects the central longitudinal axis of the main conveyor section defined by chains 14. As best seen in FIG. 4, the disc 66 is mounted upon the underside of platform 64 by a large diameter bearing designated generally 68 which includes an annular series of balls 70 trapped between upper and lower races 72, 74, respectively fixed to platform 64 and disc 66. Platform 64 is formed with an enlarged circular opening 76 centered on axis A, and a relatively large diameter sprocket 78 is fixedly secured to disc 70 in coaxial relationship to the disc at a location above platform 64 by a plurality of bolt and spacer assemblies 80 which are symmetrically disposed about axis A. An endless chain 82 (FIG. 1) is operatively trained about sprocket 78 and a second sprocket 84 which is in turn driven by the output shaft of a rotary air motor-gear reducer assembly designated generally 86.

The lower surface of disc 68, as will be described below, is employed to frictionally drive wheels in rotation during the soaping operation and preferably is covered with a pad (not shown) which may be slightly resilient and formed with a surface texture which will provide a good frictional coupling between the disc and a wheel.

Referring now particularly to FIGS. 1 and 2, a cone 90 is located in coaxial relationship with the axis of rotation of disc 66 in a normal rest position shown in full line in FIGS. 1 and 2. Cone 90 is mounted for free rotation about axis A upon the piston rod 92 of a relatively long stroke reciprocatory air motor 94 whose cylinder is fixedly mounted on frame F. A guide plate 96 is employed to provide lateral support to the cone (which is rotatable relative to the guide plate) and carries a pair of fixed downwardly projecting guide rod 98 which are slidably received within guide sleeves 100 fixedly mounted on frame F.

Referring now particularly to FIG. 2, operation of the air motor 92, 94 may be employed to drive the cone 90 upwardly from its retracted position shown in full line in FIG. 2 into the central opening of a wheel W, supported by chains 14, when the wheel W is engaged with the elevated stop pins 58 (FIG. 1). Motor 92, 94 is further operable to drive the cone 90 upwardly beyond the position shown in broken line in FIG. 2 to lift the engaged wheel W upwardly from chains 14 until the uppermost rim of the wheel is pressed firmly into engagement with the underside of drive disc 66. Operation of air motor 86 to drive the disc 66 in rotation will frictionally drive the wheel W engaged with disc 66 and the freely rotatable cone and, as will be described in more detail below, during such rotation liquid soap or lubricant is sprayed from a spray nozzle 102 against the upper rim of the wheel during the rotation previously described.

ENVIRONMENT

Before describing the operation of the wheel soaper, the environment in which it is designed to operate will be briefly described.

The wheel soaper of the present application is designed for use in a tire-wheel assembly line which typically will form a branch of a vehicle assembly line. Present day vehicle assembly lines typically will run two or more different vehicle models in random succession through the line and each vehicle model typically may have two or more wheel options. In the case of passenger car vehicles, it is now customary to provide the vehicle with a so-called mini-spare whose wheel is smaller in several dimensions than the four wheels which are mounted on the vehicle axles. Where the production output of the wheel soaper must be directly correlated to the various models and options of vehicles passing along the main assembly line, the soaper, as well as other machines in the tire assembly line, must be capable of handling wheels whose inner and outer diameters and axial widths can vary substantially from wheel to wheel and to process these wheels at a rate matching that of the main vehicle assembly line.

The wheel soaper described above is but one station of the tire-wheel assembly line, and wheels to be soaped are conveyed to the soaper in succession by a suitable conveying means, not shown, and discharged, after soaping from the soaper to be advanced into a subsequent station, not shown, at which a tire is mounted on the wheel. The wheels are received by the soaper upon conveyor rollers 12, with the wheel in a horizontal position.

As stated above, the wheel soaper of the present invention will, in a manner to be described below, accept and soap wheels whose outside diameter, central opening diameter, and axial width may vary over a range of dimensions whose maximum and minimum dimensions may differ by as much as three to five inches. Certain dimensions of the machine are thus related to the range of dimensional variations of the wheels which are to be handled.

The vertical distance between the upper run of roller chains 14 and the lower surface of the drive disc 66 must be larger than the maximum axial width of wheels to be handled by the soaper, and the stroke of the cone lifting motor 92, 94 must be greater than the stroke required to elevate a wheel of minimum axial width from chains 14 into firm contact with disc 66.

The diameter of disc 66 should exceed the maximum outer diameter of wheel to be handled.

The relationship of the axis A of cone 90 to stop pins 58 must be related to the range of outside diameters and central opening diameters of wheels to be handled such that the cone axis will pass through the central opening of any wheel whose rim is engaged by the elevated stop pins 58. It is not necessary that the axis of a wheel engaged by stop pins 58 be coaxial with the cone axis, but it is necessary that the cone axis pass somewhere through the central opening of that wheel.

Stationary guide rails 104 (FIGS. 2 and 3) extend in parallel outwardly spaced relationship to the upper runs of chains 14 to approximately confine the wheels laterally of chains 14, and guide rails 104 thus must be spaced from each other by a distance exceeding the maximum outer diameter of wheels to be passed through the apparatus. The fact that the wheel axis may not be centered exactly between the two chains 14 is again compensated for by the cone. The base of the cone must be of a diameter greater than the maximum diameter of central openings in the wheels being handled.

OPERATION

The various driving and wheel manipulating elements of the wheel soaper are all air powered, as is the soap spray nozzle 102. Solenoid controlled on-off valves are employed to control the operation of the rotary conveyor drive motor 28 and disc drive motor 86, as well as spray nozzle 102. Conventional solenoid control reversing valves are likewise employed to control the operation of the stop pin actuating motors 56, 62 and the lift motor 92, 94 employed to raise and lower cone 90. Actuation of the various valve controlling solenoids may in turn be controlled by any of several commercially available programmable controllers in a manner well known to those skilled in the art, and a detailed description of the pneumatic connections, solenoid actuated valves and programmable controller is not believed essential to an understanding of the present invention. Programmable controllers afford a wide degree of flexibility in establishing an operating cycle, and the operating cycle described below is a preferred, but not mandatory, cycle.

Apart from the structure described above, the wheel soaper will be provided with appropriately located detectors or sensors connected into the control system to generate a signal establishing the presence or absence of a wheel at various positions along the soaper conveyor. These detectors or sensors may take the form of conventional commercially available limit switches, pressure sensors or photocell systems well known to those skilled in the art.

The programmable controller will be programed to start an operational cycle when all of the following conditions are met:

1. Entrance stop pins 52 are in their elevated position and engaged by the leading edge of a first wheel resting upon the right hand to conveyor rollers 12 as viewed in FIGS. 1 and 3;
2. Piston rod 92 of the cone lift cylinder 94 is at its lower end limit of movement with the tip of the cone below the upper run of chains 14 as shown in full line in FIG. 1;
3. There is no wheel at any location on chains 14, upstream from stop pins 58;
4. Stop pins 58 are in their up position, projecting upwardly above chains 14;
5. The disc drive motor 86 is stopped and disc 66 is not rotating;
6. Spray nozzle 102 is turned off; and
7. Conveyor drive motor 28 is operating to drive chains 14 and conveyor rollers 12 in conveying movement.

When all of the foregoing conditions are met, the operating cycle is started by lowering stop pins 52 to their retracted position which permits the first wheel previously held stationary by these pins to advance across conveyor rollers 12 onto chains 14 and to be advanced by chains 14 toward the elevated stop pins 58.

As the first wheel advances onto chains 14 and clears stop pins 52, the controller actuates motors 56 to return stop pins 52, to their elevated position. The raising of stop pins 52 as soon as the first wheel has cleared these pins, enables a second wheel to be fed onto conveyor rollers 12 from the wheel supply system (not shown). Because, as described above, the conveying chains 14, of the wheel soaper, are driven at a higher conveying speed than rollers 12, wheels may be accumulated in head to tail contact with each other upstream of stop pins 52 to assure a continuous supply of wheels to the soaper. When a wheel is released by the retraction of stop pins 52, the higher conveying speed of chains 14 opens up a gap between the wheel moving on to the chains and the following wheel, which affords a sufficient time interval for stop pins 52 to be raised once the first wheel has cleared the pins and before the following wheel arrives at the pins.

Arrival of the first wheel into contact with stop pins 58 is detected by a suitable detector which will signal the programmable controller to commence the timed sequence of events described below.

At the beginning of the timed sequence, lift motor 94 is pressurized to elevate cone 90 from its fully retracted position upwardly into the central opening of the wheel engaged by stop pins 58. Continued upward movement of cone 90 lifts the wheel clear of chains 14 and upwardly above stop pins 58. If the initial engagement of the cone within the wheel opening is not accurately coaxial with the wheel axis, as the wheel is lifted by the cone it will slide along the downwardly divergent wall of the cone until it is accurately self-centered with respect to the cone.

While this last action is occurring, the programmable controller will stop the conveyor drive motor 28 and lower stop pins 58 to their retracted position. The rotary device motors 28 and 86 will stop rotating almost instantaneously when their air supply is shut off.

The cone 90 continues to elevate until it presses the uppermost rim of the wheel firmly into engagement with the bottom of disc 66. The supply line which is supplying pressure to the cone lift cylinder 90 is equipped with a pressure regulator to establish and maintain pressure in cylinder 94 sufficient to hold the wheel firmly against disc 66 with a predetermined clamping force while relieving pressure in excess of the necessary amount. The pressure regulator may also be employed in conjunction with a pressure switch which, upon sensing the excess pressure resulting from the engagement of the wheel with the drive disc 66, may be employed to signal the controller to supply air to motor 86 to drive disc 66 in rotation and to simultaneously turn on spray nozzle 102 to spray soap against the rim of the rotating wheel.

Rotating and spraying are continued for a predetermined time interval and at the conclusion of this timed interval spray nozzle 102 is turned off and the supply of air to motor 86 is also shut off.

At this time, the piston rod 92 of the cone lift cylinder 94 is retracted to lower the soaped wheel onto chains 14. As the cone returns to its fully retracted position, it withdraws from the central opening of the wheel, as the wheel is returned to the chains, and the supply of air to conveyor drive motor 28 is re-established to start the chains and rollers in movement. The wheel is then conveyed by the chains to the left as viewed in FIG. 1 to be discharged from the soaper.

As the soaped wheel is carried by chains 14 past stop pins 58, the controller actuates motors 62 to return stop pins 58 to their elevated position and the conditions for starting a second cycle are established.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Wheel soaping apparatus for spraying a soap composition onto the rims of wheels having different outside diameters, axial widths, and central opening diameters fed to said apparatus in random succession, said apparatus comprising conveying means for conveying wheels in a horizontal position along a fixed path to and from a soaping station, downwardly facing rotary drive means located at said soaping station and mounted for rotation about a fixed vertical axis at a location spaced above the path of movement of wheels along said conveying means, a downwardly divergent cone member mounted for free rotation in coaxial relationship to said first axis, means for driving said cone member in vertical movement along said axis upwardly from and downwardly to a normally maintained rest position wherein said cone is spaced below the path of movement of wheels along said conveying means, retractable stop means on said conveying means operable to stop a wheel on said conveying means at a location where said vertical axis passing through the central opening in the wheel, control means operable when a wheel is stopped at said location by said stop means for elevating said cone member upwardly from said rest position into the central opening of the wheel and to lift the wheel upwardly from said conveying means until the uppermost rim of the wheel is frictionally clamped against said drive means, and spray means operable to spray a soap composition onto the uppermost rim of said wheel when said wheel is so clamped against said drive means.

2. The invention defined in claim 1 wherein said rotary drive means comprises a disc having a flat lower surface of a diameter larger than the largest outside diameter of a wheel to be soaped by said apparatus.

3. The invention defined in claim 2 wherein said conveying means comprised a pair of endless chains mounted for coordinated movement along an endless path leaving spaced parallel horizontal upper runs defining said endless path, said vertical axis intersecting said path midway between said chains.

4. The invention defined in claim 3 wherein said conveying means includes horizontal guide rails extending in parallel outwardly spaced relationship to said horizontal rims of said chains, said guide rails being spaced from each other by a distance greater than the largest outside diameter of wheels to be soaped by said apparatus.

5. The invention defined in claim 2 wherein said control means comprises fluid pressure actuated means for elevating said cone member until the wheel supported thereon is clamped against the lower surface of said disc with a predetermined force.

6. The invention defined in claim 3 wherein said stop means comprises a pair of vertically reciprocable pins movable from a retracted position spaced below said upper runs at respective positions symmetrically spaced inwardly of said upper runs to an upwardly extended position where said pins project above said upper runs.

* * * * *

UNITED STATES PATENT AND TRADEMARK OFFICE
CERTIFICATE OF CORRECTION

PATENT NO. : 4,723,563

DATED : February 9, 1988

INVENTOR(S) : John P. Kane

It is certified that error appears in the above-identified patent and that said Letters Patent is hereby corrected as shown below:

Column 3, line 28, delete "portions" and insert --portion--.

Column 3, line 42, delete "70" and insert --66--.

Column 3, line 50, delete "68" and insert --66--.

Column 3, line 66, delete "rod" and insert --rods--.

Column 6, line 54, delete "90" and insert --94--.

Column 8, line 17, delete "comprised" and insert --comprises--.

Signed and Sealed this

Ninth Day of August, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,723,563

DATED : February 9, 1988

INVENTOR(S) : John P. Kane

It is certified that error appears in the above-identified patent and that said Letters Patent is hereby corrected as shown below:

In the Drawings,

Sheet 3, Fig. 3, the reference numeral 42 and corresponding leader line have been added.

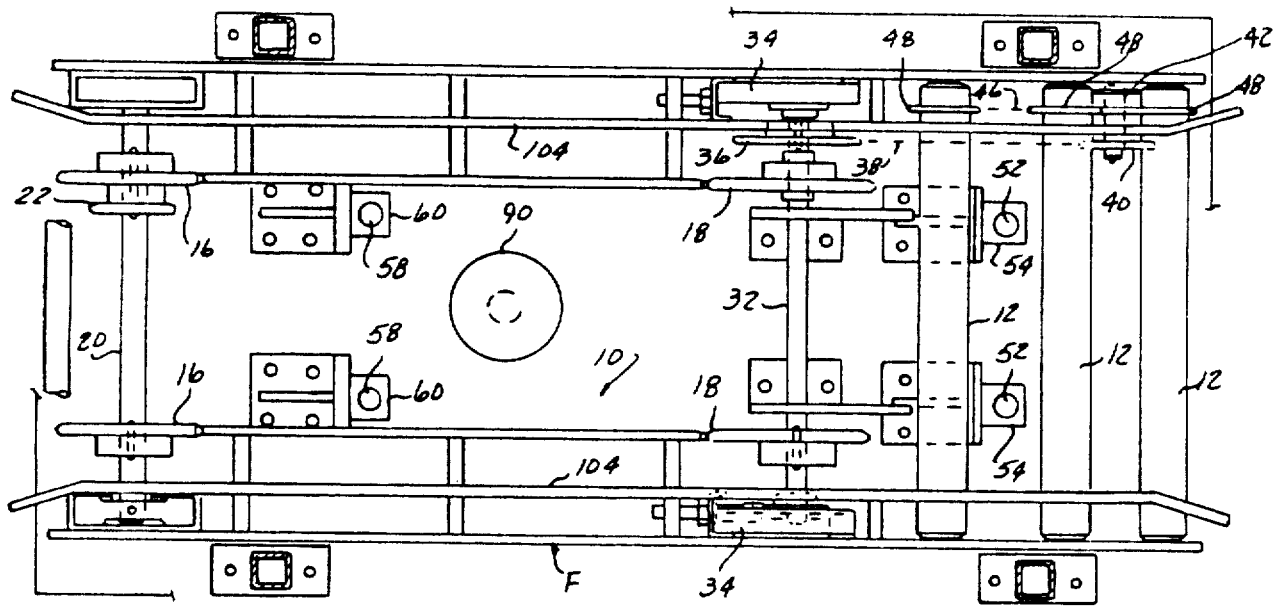

FIG-3